United States Patent Office 2,765,159
Patented Oct. 2, 1956

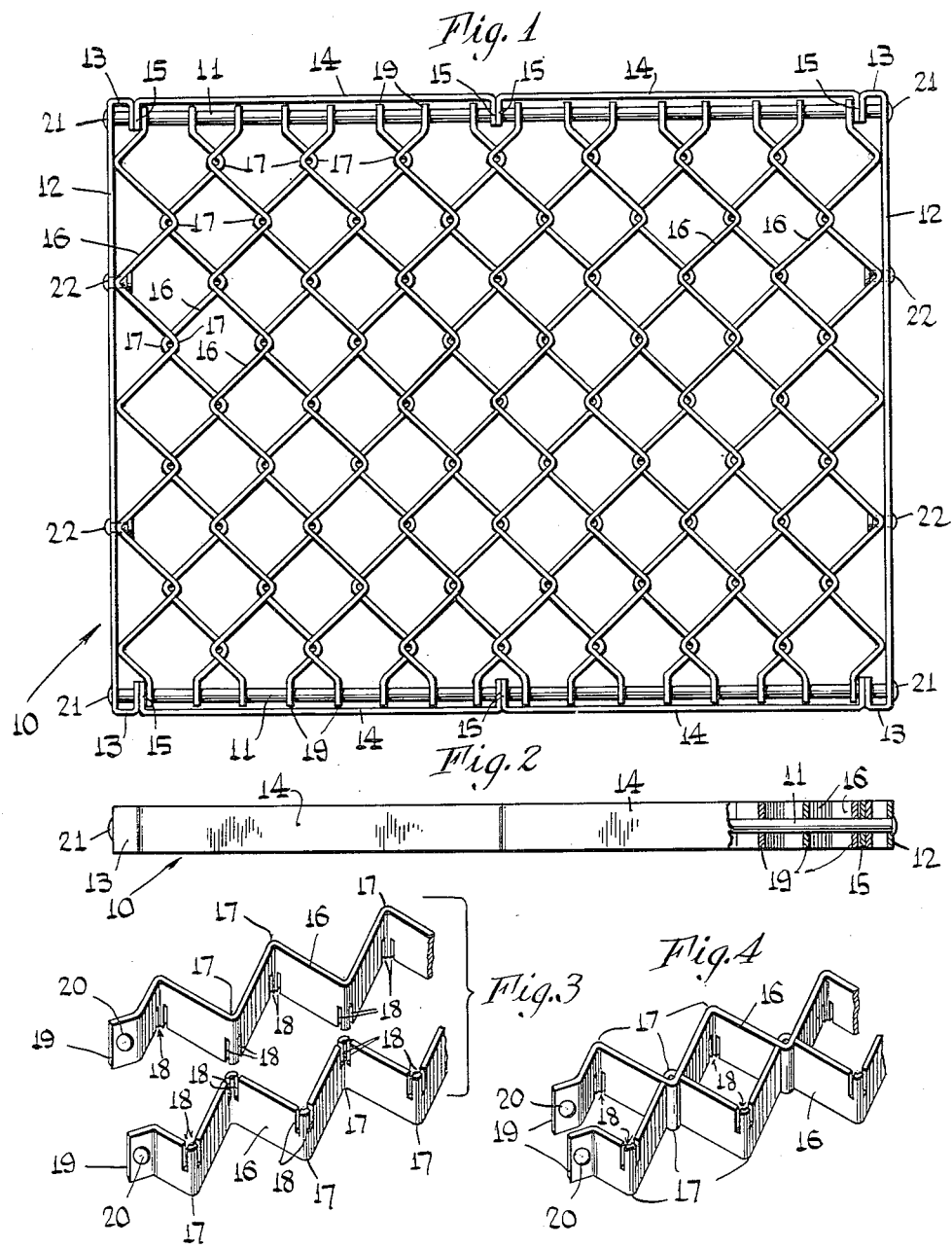

2,765,159

HEAT TREAT TRAY

Emil V. Garofalo, Fairfield, Conn., assignor to Wiretex Manufacturing Company, Incorporated, Fairfield, Conn., a corporation of Connecticut Application June 17, 1954, Serial No. 437,384

9 Claims. (Cl. 263—47)

This invention relates to metal supporting trays or grids as used for holding articles to be treated in heat-treating furnaces and the like.

The invention is shown as embodied in a tray having a diamond design of grid; however, it should be understood that such showing is for illustrative purposes only, since the particular shape or design of the grid may be varied or modified to a great extent without departing from the spirit of the invention.

In the past, supporting trays or grids for carrying articles which are to be heat treated have been made up both as castings and fabricated strip-metal structures. The cast trays have been found objectionable because of the high ratio of weight to strength, and because the internal forces created during the heating of the tray caused warpage and mechanical failure.

Trays made up as fabricated units from metal strips were found to have a better ratio of weight to strength, but these trays were either more costly in their fabrication or, if economical welding procedures were followed, were also likely to warp and suffer mechanical failure due to the setting up of internal stresses as a consequence of the heating. As an illustration, in one particular type of fabricated strip annealing tray of diamond-grid design wherein reversely bent strips were welded together at the apexes of the bends to form the grid, the internal forces set up in the structure caused failure of the welded joints, usually rendering the tray incapable of further use.

An object of the present invention is to provide a novel and improved, fabricated strip metal supporting tray or grid for use in annealing furnaces and the like, which may be easily, quickly and economically fabricated and which is at the same time strong and durable in its construction so that it will withstand internal stresses without failure for an extended period of use.

Another object of the invention is to provide an improved, fabricated strip-metal type of supporting tray or grid, wherein internal stresses due to high temperatures are reduced, and which is so designed that what internal stresses do exist will not cause serious warpage or failure of the tray.

A further object of the invention is to provide an improved supporting tray or grid as above set forth, which may be economically produced without the necessity for welding the component parts, thereby eliminating an assembly procedure which in the past has been a cause of failure.

Yet another object of the invention is to provide an improved, fabricated strip-metal tray in accordance with the above, which may be readily sectionalized or made up in sections in order to obtain different overall sizes and shapes.

A feature of the invention resides in the provision of an improved, fabricated tray as characterized above, wherein most of the components of the grid are duplicates of each other, enabling tooling to be simplified, simplifying inventories of parts, etc.

Another feature of the invention resides in the provision of an improved fabricated metal supporting grid which is so arranged and organized that sagging of the grid structure is prevented in a simple and effective manner.

Other features and advantages will hereinafter appear.

In the accompanying drawings:

Figure 1 is a top or plan view of an improved, fabricated strip-metal grid made in accordance with the invention.

Fig. 2 is a front view partly in elevation and partly in section, of the grid of Fig. 1.

Fig. 3 is a fragmentary perspective view of two adjacent, reversely-bent, strip-metal components of the grid prior to their assembly.

Fig. 4 is a view of the components of Fig. 3 after being assembled to each other.

As shown, the improved, fabricated strip-metal grid or tray of this invention comprises a generally rectangular outer frame 10 which is preferably formed of a pair of parallel rods 11 constituting marginal portions of the tray, the extremities of the rods 11 passing through openings in strip-metal frame members 12 extending perpendicular to the rods 11. The members 12 and rods 11 constitute a grid-supporting framework as will be later brought out, and preferably the extremities 13 of the members 12 are bent to form a U-shape and are additionally apertured to accommodate the rods 11, as shown in Fig. 1. The grid-supporting framework 10 also comprises metal strips 14 having bent, laterally-extended extremities 15 which are apertured to accommodate the rods 11 and to enable the strips to be carried thereby.

In accordance with this invention, a novel economically-produceable grid structure is provided, mounted within the frame 10, which is formed of fabricated, strip-metal construction entirely devoid of welds, and which is strong and light in weight, and resistant to warpage or failure due to internal stresses such as are set up by elevated temperatures. This improved grid comprises a plurality of metal strips 16 which are preferably all duplicates of each other, each strip being bent zigzag fashion, that is, having reversely-bent apex portions 17. The strips 16 are adapted to extend generally alongside each other and from one of the spaced rods 11 to the other, with their alternate apex portions 17 juxtaposed.

For the purpose of securely fastening the apex portions 17 to each other, the strips 16 are provided with pairs of slots 18 in said apex portions, one strip 16 having slots in its lower edge and the adjacent strips 16 on both sides of said one strip having the slots 18 in their upper edges, and so on. This arrangement of slots is effected by the particular positions in which the strips 16 are placed. The pairs of slots 18 are so arranged that they can accommodate the unslotted edge portions of the strips, thereby to effect an interlocking engagement of said apex portions and prevent relative lateral movement of the strips 16.

In Fig. 3 a pair of slotted strips 16 is ready for assembly, and in Fig. 4 the strips 16 are assembled to each other, with their alternate apex portions 17 interlocked. The extremities 19 of the strips 16 have openings 20 by which the strips may be carried on the rods 11 of the frame, as shown.

I have found that, by the above construction, a strong and sturdy supporting grid or tray is obtained which is entirely devoid of welds and consequent likelihood of failure of welded connections. The strips 16 which are adjacent the frame members 12 are secured to said frame members at intervals by rivets 22, and this type of fastening is not likely to fail in response to internal stresses set up by elevated temperatures. The grid comprising the interlocking strips 16 is sturdily supported by the frame bars 11 and side frame members 12, including the rivets 22, and it will be evident that the entire tray is thus formed of a number of different types of interlocking connections, as effected either by the pairs of slots 18 or the apertured portions of the strips 16 which receive the rods 11 or rivets 22. The frame members 12 and 14, being apertured and receiving the rods 11, have interlocking engagement therewith also, and accordingly a sturdy and reliable construction is obtained which is not subject to failure during normal usage. Preferably the ends of the rods 11 are headed over at 21, to hold the framework together.

The improved, fabricated tray of this invention as described above readily lends itself to sectionalized fabrication. For example, the tray may be made up with eight of the strips 16, comprising the left portion of Fig. 1 as contained between the left pair of frame members 14 carried on the bars 11. In such event the bars 11 would be approximately half the length shown, and the tray or grid would accordingly be half the size shown in the figure. Any number of sections of eight strips 16, within limits may be assembled on rods 11 of suitable length, to produce trays or grids of different widths, and large trays made up in this manner would retain the sturdy characteristics of the smaller trays inasmuch as the support of the grid at intermediate points on the rods 11 is secured from the rods themselves, and is independent of the distance between the side frame members 12. In this connection, it is pointed out that each strip 16 is supported at both ends by the rods 11, and at inner points on the grid such support is independent of the frame members 12.

While the grid shown in the figures is of diamond design, other designs are possible utilizing the principle of the invention.

Variations and modifications may be made within the scope of the claims and portions of the improvements may be used without others.

I claim:

1. A supporting grid comprising a plurality of reversely bent strips of flat sheet metal extending in general alongside each other with adjacent opposed bent portions of the strips crossing, said crossing portions of one set of alternate strips having notches in their upper edges when the grid is horizontal and the crossing portions of the other set of alternate strips having notches in their lower edges, said notches of any one strip accommodating the crossing portions of an adjoining strip whereby the strips are interlocked with each other against lateral movement.

2. A supporting grid of generally diamond design, comprising a plurality of zigzag bent strips of flat sheet metal extending in general alongside each other with adjacent opposed bent portions of the strips crossing, said crossing portions of one set of alternate strips having notches in their upper edges when the grid is horizontal and the crossing portions of the other set of alternate strips having notches in their lower edges, said notches of any one strip accommodating the crossing portions of an adjoining strip whereby the strips are interlocked with each other against lateral movement.

3. A supporting grid comprising a pair of sheet metal strips having reverse bends, said strips extending in general alongside each other with apex portions of certain of said bends juxtaposed and crossing, said juxtaposed portions having pairs of notches, one pair in an upper edge and another pair in a lower edge when the grid is horizontal, said pairs of notches accommodating the remaining lower and upper edges of the apex portions whereby said portions are interlocked against movement laterally of the strips.

4. A supporting grid of diamond design, comprising a pair of zigzag bent strips of flat sheet metal extending in general alongside each other with the apex portions of alternate bends juxtaposed and crossing, said juxtaposed portions having pairs of notches, one pair in an upper edge and another pair in a lower edge when the grid is horizontal, said pairs of notches accommodating the remaining lower and upper edges of the apex portions whereby said portions are interlocked against movement laterally of the strips.

5. A supporting grid comprising a plurality of reversely bent strips of flat sheet metal extending in general alongside each other with adjacent opposed bent portions of the strips crossing, said crossing portions of one set of alternate strips having notches in their upper edges when the grid is horizontal and the crossing portions of the other set of alternate strips having notches in their lower edges, said notches of any one strip accommodating the crossing portions of an adjoining strip whereby the strips are interlocked with each other against lateral movement; a rigid frame extending around the interlocked strips for supporting the same; and slidable interlocking connections between one pair of opposite sides of the frame and the ends of the strips.

6. The invention as defined in claim 5 in which the slidable connections include rigid bars, the said ends of the strips being apertured and said bars passing through said apertures.

7. The invention as defined in claim 6 in which the strips are all of identical configuration and are identically slotted.

8. A supporting grid comprising a plurality of reversely bent strips of flat sheet metal extending in general alongside each other with adjacent opposed bent portions of the strips crossing, said crossing portions of one set of alternate strips having notches in their upper edges when the grid is horizontal and the crossing portions of the other set of alternate strips having notches in their lower edges, said notches of any one strip accommodating the crossing portions of an adjoining strip whereby the strips are interlocked with each other against lateral movement, said strips having identical configurations and being identically slotted.

9. A supporting grid comprising a plurality of reversely bent strips of flat sheet metal extending in general alongside each other with adjacent opposed bent portions of the strips crossing, said crossing portions of one set of alternate strips having notches in their upper edges when the grid is horizontal and the crossing portions of the other set of alternate strips having notches in their lower edges, said notches of any one strip accommodating the crossing portions of an adjoining strip whereby the strips are interlocked with each other against lateral movement; a rigid frame extending around the interlocked strips for supporting the same; and slidable interlocking connections between one pair of opposite sides of the frame and the ends of the strips, said strips having apertured ends and said frame comprising bars extending through said ends, and comprising a pair of opposite members having apertured ends through which said bars extend, said members being riveted to adjacent strips.

References Cited in the file of this patent

UNITED STATES PATENTS

| | | |
|---|---|---|
| 564,568 | Meyer | July 21, 1896 |
| 1,810,748 | Berger | June 16, 1931 |
| 1,814,598 | Herrmann | July 14, 1931 |
| 2,338,784 | Ruckstahl | Jan. 11, 1944 |
| 2,609,781 | Gruetjen | Sept. 9, 1952 |